United States Patent
Haggmark et al.

(10) Patent No.: US 10,001,017 B2
(45) Date of Patent: Jun. 19, 2018

(54) TURBOMACHINE COMPONENT WITH A STRESS RELIEF CAVITY

(71) Applicant: Siemens Aktiengesellschaft, Munich (DE)

(72) Inventors: Anders Haggmark, Finspong (SE); Janos Szijarto, Finspong (SE)

(73) Assignee: Siemens Aktiengesellschaft, Munich (DE)

( * ) Notice: Subject to any disclaimer, the term of this patent is extended or adjusted under 35 U.S.C. 154(b) by 175 days.

(21) Appl. No.: 14/763,945

(22) PCT Filed: Feb. 10, 2014

(86) PCT No.: PCT/EP2014/052547
§ 371 (c)(1),
(2) Date: Jul. 28, 2015

(87) PCT Pub. No.: WO2014/146827
PCT Pub. Date: Sep. 25, 2014

(65) Prior Publication Data
US 2016/0017716 A1    Jan. 21, 2016

(30) Foreign Application Priority Data
Mar. 20, 2013    (EP) .................................... 13160209

(51) Int. Cl.
| | |
|---|---|
| *F03B 11/00* | (2006.01) |
| *F01D 5/14* | (2006.01) |
| *F03D 11/04* | (2006.01) |
| *F04D 29/38* | (2006.01) |
| *F01D 5/18* | (2006.01) |

(Continued)

(52) U.S. Cl.
CPC ................. *F01D 5/18* (2013.01); *B23H 9/10* (2013.01); *F01D 9/041* (2013.01); *F01D 11/006* (2013.01);
(Continued)

(58) Field of Classification Search
USPC ............. 415/139, 115, 191, 211.2; 416/97 R
See application file for complete search history.

(56) References Cited

U.S. PATENT DOCUMENTS

| | | | |
|---|---|---|---|
| 6,210,111 B1 * | 4/2001 | Liang | ...................... F01D 5/187 415/115 |
| 6,761,536 B1 | 7/2004 | Bash et al. | |

(Continued)

FOREIGN PATENT DOCUMENTS

| | | |
|---|---|---|
| CH | 699998 A1 | 5/2010 |
| EP | 1867837 A2 | 12/2007 |

(Continued)

OTHER PUBLICATIONS

CN Office Action, dated Apr. 12, 2016, for CN application No. 201480017011.9.
(Continued)

*Primary Examiner* — Deming Wan
(74) *Attorney, Agent, or Firm* — Beusse Wolter Sanks & Maire

(57) ABSTRACT

A turbomachine component with a stress relief cavity includes an airfoil and a platform. The airfoil has a trailing edge. The platform has a trailing edge region, a seal strip slot and a stress relief cavity. The trailing edge region supports at least a part of the trailing edge. The stress relief cavity extends inside the platform into the trailing edge region and is an extension of the seal strip slot.

13 Claims, 5 Drawing Sheets

(51) Int. Cl.
  *F01D 11/00* (2006.01)
  *B23H 9/10* (2006.01)
  *F01D 9/04* (2006.01)

(52) U.S. Cl.
  CPC ...... *F05D 2220/30* (2013.01); *F05D 2230/10* (2013.01); *F05D 2240/12* (2013.01); *F05D 2240/122* (2013.01); *F05D 2240/30* (2013.01); *F05D 2240/304* (2013.01); *F05D 2240/80* (2013.01); *F05D 2260/94* (2013.01); *F05D 2260/941* (2013.01)

(56) References Cited

U.S. PATENT DOCUMENTS 8,684,664 B2 * 4/2014 Harris, Jr. .............. F01D 5/081
  29/889.721

| | | |
|---|---|---|
| 2005/0135936 A1 | 6/2005 | Cherolis et al. |
| 2010/0172748 A1 | 7/2010 | Snook et al. |
| 2011/0286834 A1 | 11/2011 | Wardle et al. |
| 2012/0148355 A1 * | 6/2012 | Clarke .................. G01M 3/26 408/1 R |
| 2012/0251331 A1 | 10/2012 | Dietrich et al. |
| 2012/2251331 | 10/2012 | Dietrich et al. |

FOREIGN PATENT DOCUMENTS

| | | |
|---|---|---|
| EP | 1956196 A2 | 8/2008 |
| EP | 2110513 A2 | 10/2009 |
| RU | 2004137037 A | 5/2006 |

OTHER PUBLICATIONS

Russian Federation official notification dated Nov. 29, 2017, for RU patent application No. 2015144864.

* cited by examiner

TURBOMACHINE COMPONENT WITH A STRESS RELIEF CAVITY

CROSS REFERENCE TO RELATED APPLICATIONS

This application is the US National Stage of International Application No. PCT/EP2014/052547 filed Feb. 10, 2014, and claims the benefit thereof. The International Application claims the benefit of European Application No. EP13160209 filed Mar. 20, 2013. All of the applications are incorporated by reference herein in their entirety.

FIELD OF INVENTION

The present invention relates to a turbomachine component and more particularly to a platform supporting an airfoil in the turbomachine.

BACKGROUND OF INVENTION

A turbomachine and its parts are continuously subject to mechanical and/or thermal stresses during operation. For example in a gas turbine engine as the air and hot combustion gases are directed by turbine blades and vanes through various sections of the turbine, the blades and vanes are subjected to extremely high operating temperatures and mechanical stresses. One such region of high stresses is the joint between an airfoil and a corresponding platform from which the airfoil extends, especially in vicinity of the trailing edge, i.e. the region in the platform from where the trailing edge of the airfoil emerges. Moreover, due to the mechanical loading on the airfoil, the blade undergoes large bending and vibratory stresses. The stress is also caused by different heating and cooling rates within the components during transient operation conditions of the turbomachine.

Due to the stresses, faults or cracks develop in the region of the platform from where the trailing edge of the airfoil emerges. These faults or cracks jeopardize the integrity of the platform and the airfoil of the turbomachine component and finally result in reduction of usable life of the turbomachine component. Accordingly, there is a need for a turbomachine component having low stresses at the junctures between the trailing edge of the airfoil and the attached platforms.

SUMMARY OF INVENTION

It is therefore an object of the present invention to provide a technique for relieving stresses in the turbomachine component, and thereby at least partially eliminating the above mentioned problem of crack development in the region of the platform from where the trailing edge of the airfoil emerges.

The object is achieved by providing a turbomachine component and a method of forming a stress relief cavity in a turbomachine component according to the claims.

According to a first aspect of the present technique, a turbomachine component is provided. The turbomachine component contains an airfoil and a platform. The airfoil contains a trailing edge. The platform includes a leading edge face, a trailing edge face, and at least two circumferential front faces. The platform further includes a trailing edge region, a seal strip slot, and a stress relief cavity. The trailing edge region is located in the platform such that it supports at least a part of the trailing edge. The seal strip slot is provided at one of the circumferential front faces of the platform and extending in a circumferential direction into the platform, wherein the seal strip slot is suitable to receive a portion of a seal strip such that when the turbomachine component is assembled with another turbomachine component to form a turbomachine assembly, a second portion of the seal strip is suitable to be inserted in a corresponding slot of an adjacent platform and the two seal strip slots of the two turbomachine components are in opposed position and are adapted to hold a seal strip. The stress relief cavity extends inside the platform into the trailing edge region and is an extension of the seal strip slot. Further, the stress relief cavity extends into the trailing edge region to a location beneath the trailing edge. This helps in lowering stresses in the platform beneath the trailing edge.

In another embodiment of the turbomachine component, the turbomachine component is a blade. Thus the stress relief cavity helps in reducing the stress in the platform of the blade. In another embodiment of the turbomachine component, the turbomachine component is a vane. Thus the stress relief cavity helps in reducing the stress in the platform of the vane.

According to a second aspect of the present technique, a method of forming a stress relief cavity in a turbomachine component is provided. The turbomachine component includes an airfoil and a platform. The airfoil contains a trailing edge. The platform includes a leading edge face, a trailing edge face, and at least two circumferential front faces. The platform further includes a trailing edge region and a seal strip slot. The trailing edge region is located in the platform such that it supports at least a part of the trailing edge. The seal strip slot is provided at one of the circumferential front faces of the platform and extending in a circumferential direction into the platform, wherein the seal strip slot is suitable to receive a portion of a seal strip such that when the turbomachine component is assembled with another turbomachine component to form a turbomachine assembly, a second portion of the seal strip is suitable to be inserted in a corresponding slot of an adjacent platform and the two seal strip slots of the two turbomachine components are in opposed position and are adapted to hold a seal strip. In the method of the present technique the stress relief cavity is formed by extending the seal strip slot inside the platform into the trailing edge region. Further, the seal strip slot is extended into the trailing edge region to a location beneath the trailing edge to form the stress relief cavity. Thus the stress relief cavity so formed helps in lowering stresses in the platform beneath the trailing edge.

In another embodiment of the method, the seal strip slot is extended to form the stress relief cavity by removing a platform material from the platform. Thus the method may be used on a turbomachine component previously manufactured.

In another embodiment of the method, the platform material is removed by a process of electrical discharge machining. This provides an accurate process of removal of the platform material. Moreover, the process may be used for hard metals or alloys that would be very difficult to machine with traditional techniques such as cutting.

In another embodiment of the method, the turbomachine component is a blade. Thus the method may be used in forming the stress relief cavity in the blade.

In another embodiment of the method, the turbomachine component is a vane. Thus the method may be used in forming the stress relief cavity in the vane.

According to a third aspect of the present technique, a turbomachine assembly is presented. The turbomachine assembly comprising at least two turbomachine components positioned adjacent to each other, and a seal strip extending between said two turbomachine components, wherein each of said turbomachine component comprises an airfoil having a trailing edge, and a platform, said platform comprising a trailing edge region for supporting at least a part of said trailing edge, a leading edge face, a trailing edge face, and at least two circumferential front faces, and a seal strip slot provided at one of said circumferential front faces of said platform extending in a circumferential direction into said platform and suitable to receive a portion of said seal strip, and a stress relief cavity, wherein said stress relief cavity extends inside said platform into said trailing edge region, wherein said stress relief cavity is an extension of said seal strip slot, and wherein said seal strip extends partially into said seal strip slot of each of the turbomachine components.

In an embodiment of the turbomachine assembly, the stress relief cavity extends into the trailing edge region to a location beneath the trailing edge. This helps in lowering stresses in the platform beneath the trailing edge of the turbomachine assembly.

In another embodiment of the turbomachine assembly, the turbomachine component is a blade. Thus the stress relief cavity helps in reducing the stress in the platform of the blade of the turbomachine assembly.

In another embodiment of the turbomachine assembly, the turbomachine component is a vane. Thus the stress relief cavity helps in reducing the stress in the platform of the vane of the turbomachine assembly.

The present technique has various advantages. The stress relief cavity weakens the trailing edge region resulting in an increase in elasticity of the platform in and around the trailing edge region. As a result, the problem of crack or fault development in and around the trailing edge region is at least partially eliminated which further results in increased turbomachine component life. Since the stress relief cavity is formed by extending the seal strip slot, no separate additional operation is required for forming the stress relief cavity. The stress relief cavity can be formed easily during manufacturing of the seal strip slot.

BRIEF DESCRIPTION OF THE DRAWINGS

The present technique is further described hereinafter with reference to illustrated embodiments shown in the accompanying drawings, in which.

DETAILED DESCRIPTION OF INVENTION

Figure 1:
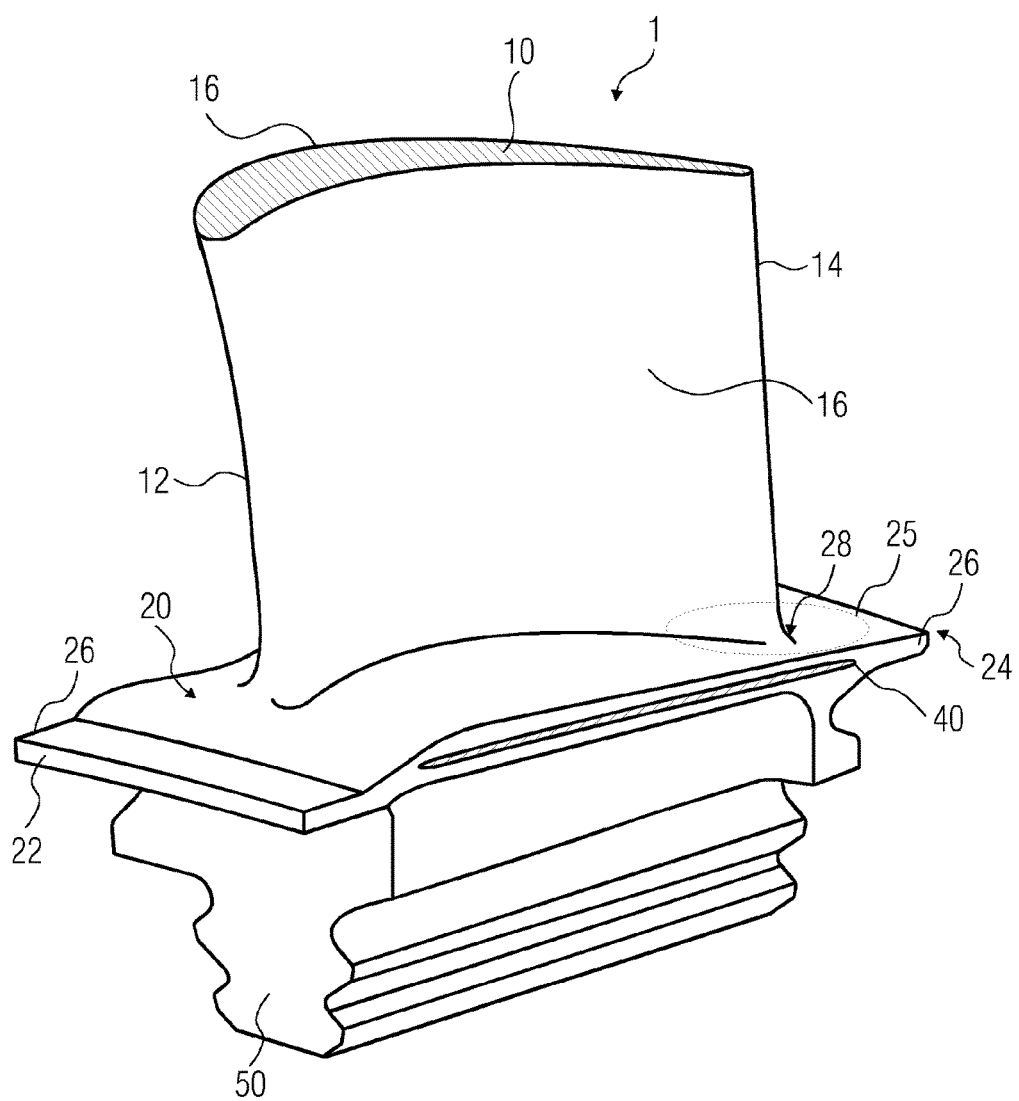
FIG. 1 is a schematic diagram representing an exemplary embodiment of a turbomachine component depicting a seal strip slot and a trailing edge region.

Hereinafter, above-mentioned and other features of the invention are described in details. Various embodiments are described with reference to the drawings, wherein like reference numerals are used to refer to like elements throughout. In the following description, for purpose of explanation, numerous specific details are set forth in order to provide a thorough understanding of one or more embodiments. It may be noted that the illustrated embodiments are intended to explain, and not to limit the invention. It may be evident that such embodiments may be practiced without these specific details.

The underlying idea of the present invention is to integrate a stress relief cavity in a platform that supports an airfoil in a turbomachine component. The stress relief cavity is formed inside the platform. The trailing edge emerges from that part of the platform surface that is located above the stress relief cavity. Thus, the stress relief cavity of the present technique is present in a region of the platform from where the trailing edge of the airfoil emerges. Moreover, the stress relief cavity is an extension of a seal strip slot. Such seal strip slots are generally present in the platform such that when the turbomachine component is assembled with other turbomachine component of preferably similar or same architecture to form a turbine disc, two seal strip slots of two adjacent turbomachine components are in opposed position and are adapted to hold a seal strip.

Referring to the FIGS. 1 to 5, it may be noted that for the purpose of explanation and not limitation, the present technique is elucidated for an exemplary embodiment of the turbomachine component 1 wherein the turbomachine component 1 is a blade of a turbine (not shown). It may further be noted that the turbomachine component 1 may also be a vane of a turbine.

Referring to FIG. 1, a schematic diagram representing an exemplary embodiment of a turbomachine component 1 depicting a seal strip slot 40 and a trailing edge region 25 is provided. The turbomachine component 1 includes a platform 20 from which an airfoil 10 and a root 50 emerge extending outward in opposite directions.

The airfoil 10 includes a leading edge 12, a trailing edge 14 and two side faces 16 each connecting the leading edge 12 and the trailing edge 14 of the airfoil 10.

The platform 20 extends radially outward from the root 50, and has a leading edge face 22 corresponding to the leading edge 12 of the airfoil 10, a trailing edge face 24 corresponding to the trailing edge 14 of the airfoil 10 and opposite the leading edge face 22, and a pair of generally parallel circumferential front faces 26 corresponding to the side faces 16 of the airfoil 10. The platform 20 also contains a trailing edge region 25 for supporting at least a part of the trailing edge 14 of the airfoil 10. In the trailing edge region 25, a location inside the platform 20 generally beneath the trailing edge 14 is represented by reference numeral 28.

The term 'trailing edge region', as used herein in the present technique, includes a three dimensional portion of the platform 20 located beneath an area extending on a surface of the platform 20 in and around a position where the trailing edge 14 of the airfoil 10 meets the platform 20.

The platform 20 also includes a seal strip slot 40 provided at one of the circumferential front faces 26 of the platform 20 and extending in a circumferential direction into the platform 20. The seal strip slot 40 is suitable to receive a portion of a seal strip (not shown) such that when the turbomachine component 1 is assembled with other turbomachine component of preferably similar or same architecture to form a turbomachine assembly (not shown) for example a turbine disc, two seal strip slots 40 of two adjacent turbomachine components 1 are in opposed position and are adapted to hold a seal strip.

Figure 2:
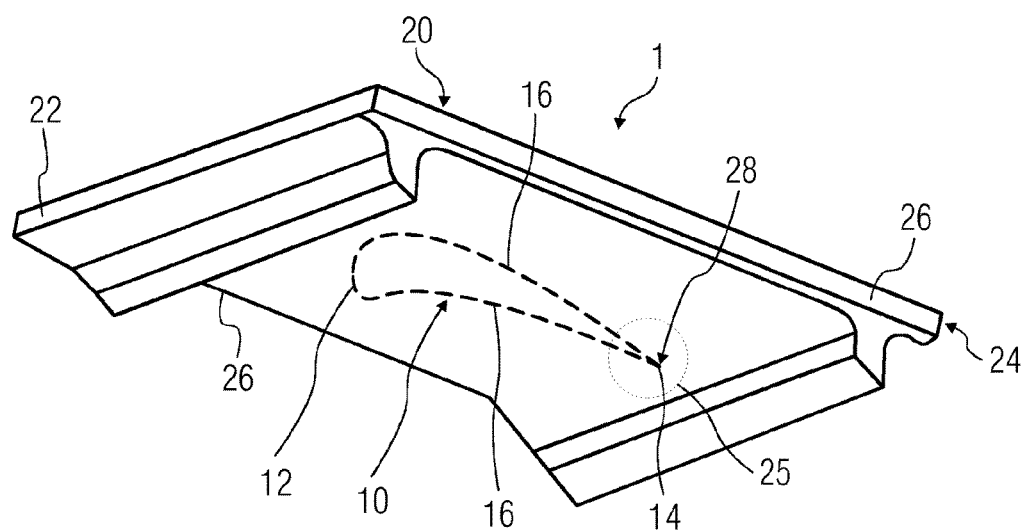
FIG. 2 is a schematic diagram representing an exemplary embodiment of the turbomachine component depicting the trailing edge region.

FIG. 2 is a schematic diagram representing a bottom view of an exemplary embodiment of the turbomachine component 1, depicting the trailing edge region 25 with respect to the leading edge 12, the trailing edge 14 and the side faces 16 of the airfoil 10 and with respect to the leading edge face 22, the trailing edge face 24 and the circumferential front faces 26 of the platform 20. The location 28 beneath the trailing edge 14 is also depicted.

Figure 3:
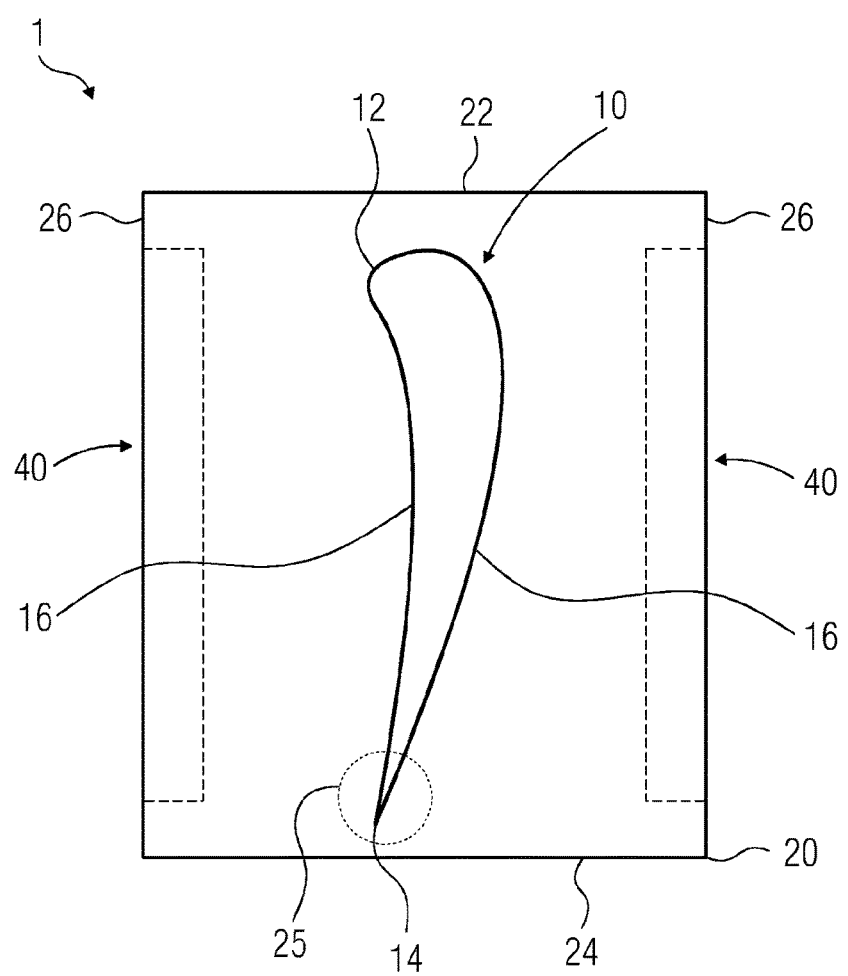
FIG. 3 is a schematic diagram representing a top view of an exemplary embodiment of the turbomachine component depicting the trailing edge region and the seal strip slot.

FIG. 3 is a schematic diagram representing a top view of an exemplary embodiment of the turbomachine component 1, depicting the trailing edge region 25 with respect to the leading edge 12, the trailing edge 14 and the side faces 16 of the airfoil 10 and with respect to the leading edge face 22, the trailing edge face 24 and the circumferential front faces 26 of the platform 20. The platform 20 contains the seal strip slot 40 provided at one of the circumferential front faces 26 of the platform 20 and extending in a circumferential direction into the platform 20. The platform 20 may have more than one such seal strip slots 40, each of which may be typically present on one of the circumferential front faces 26 of the platform 20. Generally, the platform 20 contains one such seal strip slot 40 on each of the circumferential front faces 26.

Figure 4:
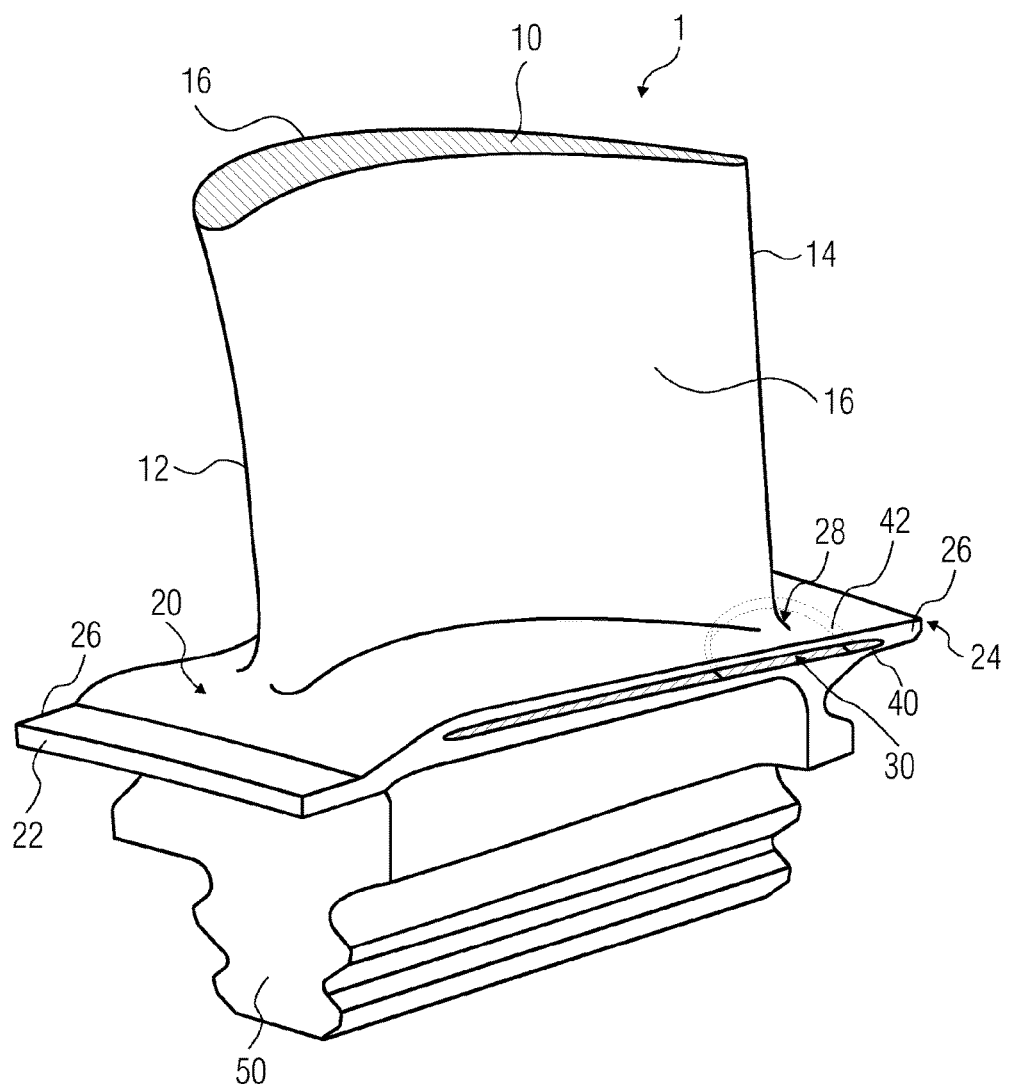
FIG. 4 is a schematic diagram representing an exemplary embodiment of the turbomachine component depicting a stress relief cavity.

Referring to FIG. 4, in combination with FIG. 1, an exemplary embodiment of the turbomachine component 1, in accordance with aspects of the present technique, is depicted. The turbomachine component 1 includes a stress relief cavity 30. The stress relief cavity 30 extends inside the platform 20 into the trailing edge region 25 and is an extension 42 of the seal strip slot 40. In other words, the stress relief cavity 30 extends inside the platform 20 from the seal strip slot 40 into the trailing edge region 25. The stress relief cavity 30 improves the flexibility of the platform in and around the trailing edge region 25 and at least partially eliminates the formation of cracks or faults resulting from thermal and/or mechanical strains.

In an exemplary embodiment of the turbomachine component 1, the stress relief cavity 30 extends into the trailing edge region 25 up to the location 28 beneath the trailing edge 14.

Figure 5:
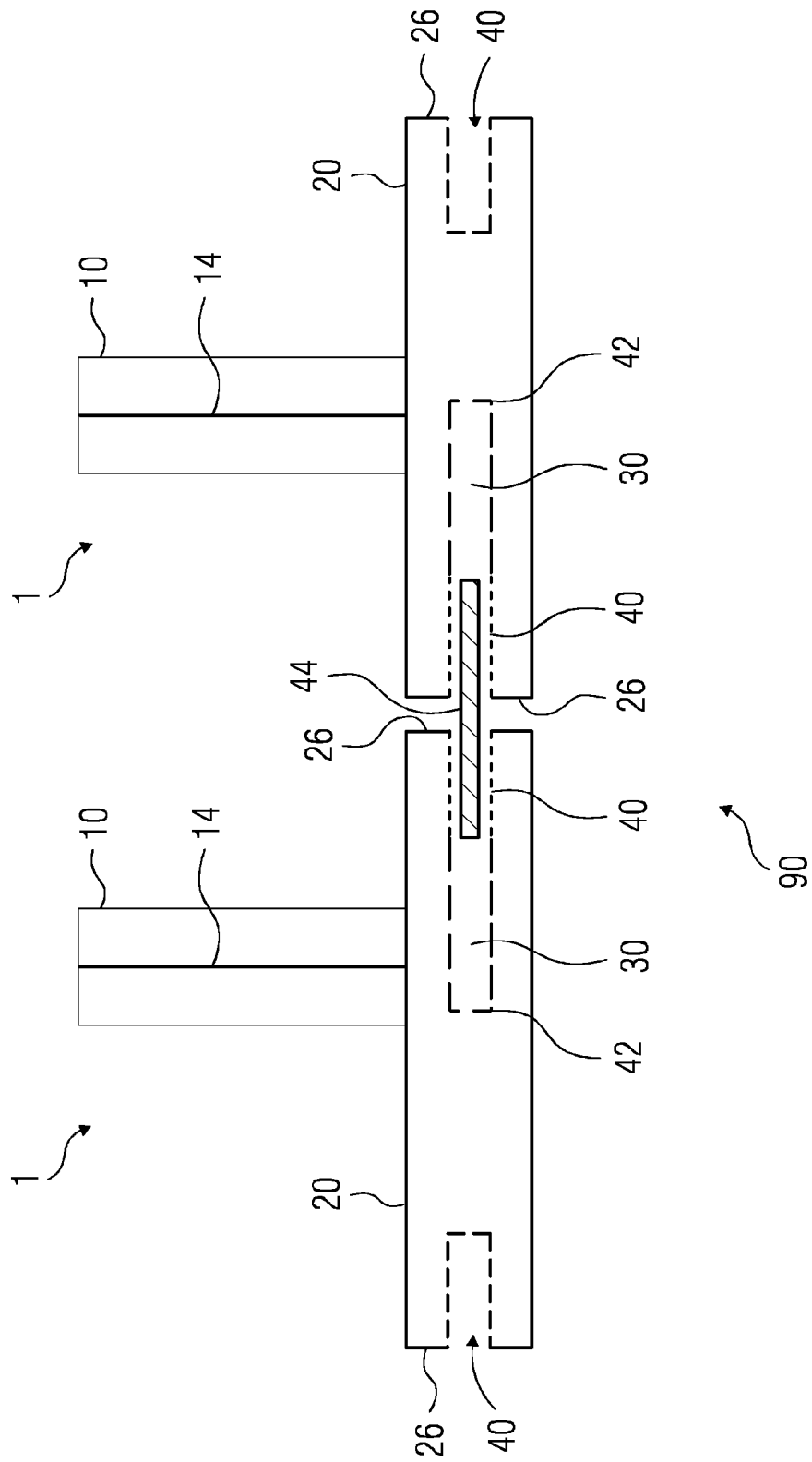
FIG. 5 is a schematic representation of a turbomachine assembly, in accordance with aspects of the present technique.

FIG. 5, in combination with FIG. 3, schematically represents a turbomachine assembly 90. The turbomachine assembly 90 includes at least two turbomachine components 1 positioned adjacent to each other, and a seal strip 44 extending between the two turbomachine components 1. Each of the two turbomachine components 1 includes the airfoil 10 having the trailing edge 14 and the platform 20. The turbomachine component 1 may be a blade or a vane of a turbine. The platform 20 includes the trailing edge region 25, the leading edge face 22, the trailing edge face 24, at least two circumferential front faces 26, the seal strip slot 40, and the stress relief cavity 30. The seal strip slot 40 is provided at one of the two circumferential front faces 26 of the platform 20 and extends in the circumferential direction into the platform 20. The seal strip slot 40 is suitable to receive a portion (not shown) of the seal strip 44. The stress relief cavity 30 extends inside the platform 20 into the trailing edge region 25. The stress relief cavity 30 is an extension 42 of the seal strip slot 40. The seal strip 44 extends partially into the seal strip slots 40 of each of the turbomachine components 1.

Referring to FIG. 5 in combination with FIGS. 2 and 3, in an embodiment of the turbomachine assembly 90, the stress relief cavity 30 extends into the trailing edge region 25 to the location 28 beneath the trailing edge 14.

In yet another embodiment of the present technique a method of forming a stress relief cavity in a turbomachine component is provided. The turbomachine component includes an airfoil and a platform. The airfoil contains a trailing edge. The platform contains a trailing edge region and a seal strip slot. The trailing edge region supports at least a part of the trailing edge. The seal strip slot is such that when the turbomachine component is assembled with other turbomachine component of preferably similar or same architecture to form a turbine disc, two seal strip slots of two adjacent turbomachine components are in opposed position and are adapted to hold a seal strip. In the method of the present technique, the stress relief cavity is formed by extending the seal strip slot through the platform into the trailing edge region. The turbomachine component may be a blade or a vane of a turbine.

In an embodiment of the method, the seal strip slot is extended into the trailing edge region to a location beneath the trailing edge to form the stress relief cavity.

In an exemplary embodiment of the method, the extension of the seal strip slot to form the stress relief cavity in the platform may be performed when the turbomachine component is cast.

Alternatively in another exemplary embodiment, the seal strip slot may be extended to form the stress relief cavity in the platform by machining the platform of the turbomachine component which at least contains the platform and the seal strip slot. In this embodiment, the extension of the seal strip slot is achieved by removing a platform material from the platform. The platform material is a material of which the platform of the turbomachine component is composed of, for example metal alloys. There are various techniques, such as milling, drilling, and so forth that may be used to remove the platform material.

In another embodiment of the method, the platform material is removed by a process of electrical discharge machining. The electrical discharge machining or electro-discharge machining may include, but not limited to, electro-discharge machining using a shaped electrode, wire electro-discharge machining, and so forth. The technique of electrical discharge machining is a subtractive manufacturing process whereby a desired shape is obtained using electrical discharges. The technique of electrical discharge machining is generally known in the art of machining technologies and thus a detailed description of the same has not been provided herein for the sake of brevity.

While this invention has been described in detail with reference to certain embodiments, it should be appreciated that the present technique is not limited to those precise embodiments. Rather, in view of the present disclosure which describes exemplary modes for practicing the invention, many modifications and variations would present themselves, to those skilled in the art without departing from the scope and spirit of this invention. The scope of the invention is, therefore, indicated by the following claims rather than by the foregoing description. All changes, modifications, and variations coming within the meaning and range of equivalency of the claims are to be considered within their scope.

The invention claimed is:

1. A method of forming a stress relief cavity in a turbomachine component, wherein said turbomachine component comprises:
   an airfoil having a trailing edge,
   a platform comprising:
   a trailing edge region for supporting at least a part of said trailing edge,
   a leading edge face, a trailing edge face, and at least two circumferential front faces, and
   a seal strip slot provided at one of said at least two circumferential front faces of said platform and extending in a circumferential direction into said platform, wherein said seal strip slot is adapted to receive a portion of a seal strip, said method comprising extending said seal strip slot to form said stress relief cavity such that said stress relief cavity extends inside said platform into said trailing edge region, wherein said seal strip slot is extended into said trailing edge region to a location directly beneath said trailing edge to form said stress relief cavity, and wherein said seal strip slot is axially aligned with said trailing edge with respect to an axial direction that extends from the leading edge face to the trailing edge face.

2. The method according to claim 1, wherein said seal strip slot is extended to form said stress relief cavity by removing a platform material from said platform.

3. The method according to claim 2, further comprising removing said platform material by a process of electrical discharge machining.

4. The method according to claim 1, wherein said turbomachine component is a blade.

5. The method according to claim 1, wherein said turbomachine component is a vane.

6. A turbomachine component comprising:

an airfoil having a trailing edge, and a platform comprising:

a trailing edge region for supporting at least a part of said trailing edge, a leading edge face, a trailing edge face, and at least two circumferential front faces, a seal strip slot provided at one of said at least two circumferential front faces of said platform and extending in a circumferential direction into said platform, wherein said seal strip slot is adapted to receive a portion of a seal strip, and a stress relief cavity, wherein said stress relief cavity extends inside said platform into said trailing edge region and wherein said stress relief cavity is an extension of said seal strip slot, wherein said stress relief cavity extends into said trailing edge region to a location directly beneath said trailing edge, and wherein said stress relief cavity is axially aligned with said trailing edge with respect to an axial direction that extends from the leading edge face to said trailing edge face.

7. The turbomachine component according to claim 6, wherein said turbomachine component is a blade.

8. The turbomachine component according to claim 6, wherein said turbomachine component is a vane.

9. The turbomachine component according to claim 6, further comprising a fillet at an interface of said trailing edge and the platform, wherein said stress relief cavity defines a perimeter, and wherein a radial projection of the perimeter fully encompasses the fillet therein.

10. The turbomachine component according to claim 6, wherein said stress relief cavity defines a perimeter that begins at a first location of the seal strip slot and extends in the circumferential direction away from said seal strip slot past said trailing edge, then in the axial direction toward said trailing edge face, and then in the circumferential direction back to end at a second location of the seal strip slot.

11. The turbomachine component according to claim 6, wherein said stress relief cavity forms a blind hole that does not fully penetrate said platform.

12. The turbomachine component according to claim 6, wherein said seal strip slot is characterized by a radial height that is the same as a radial height of said stress relief cavity.

13. The turbomachine component according to claim 12, wherein said seal strip slot and said stress relief cavity are aligned with each other with respect to a radial direction that extends from a base of the airfoil to a tip of the airfoil.

* * * * *